Figure 4:
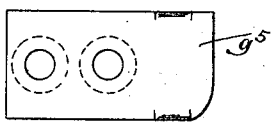

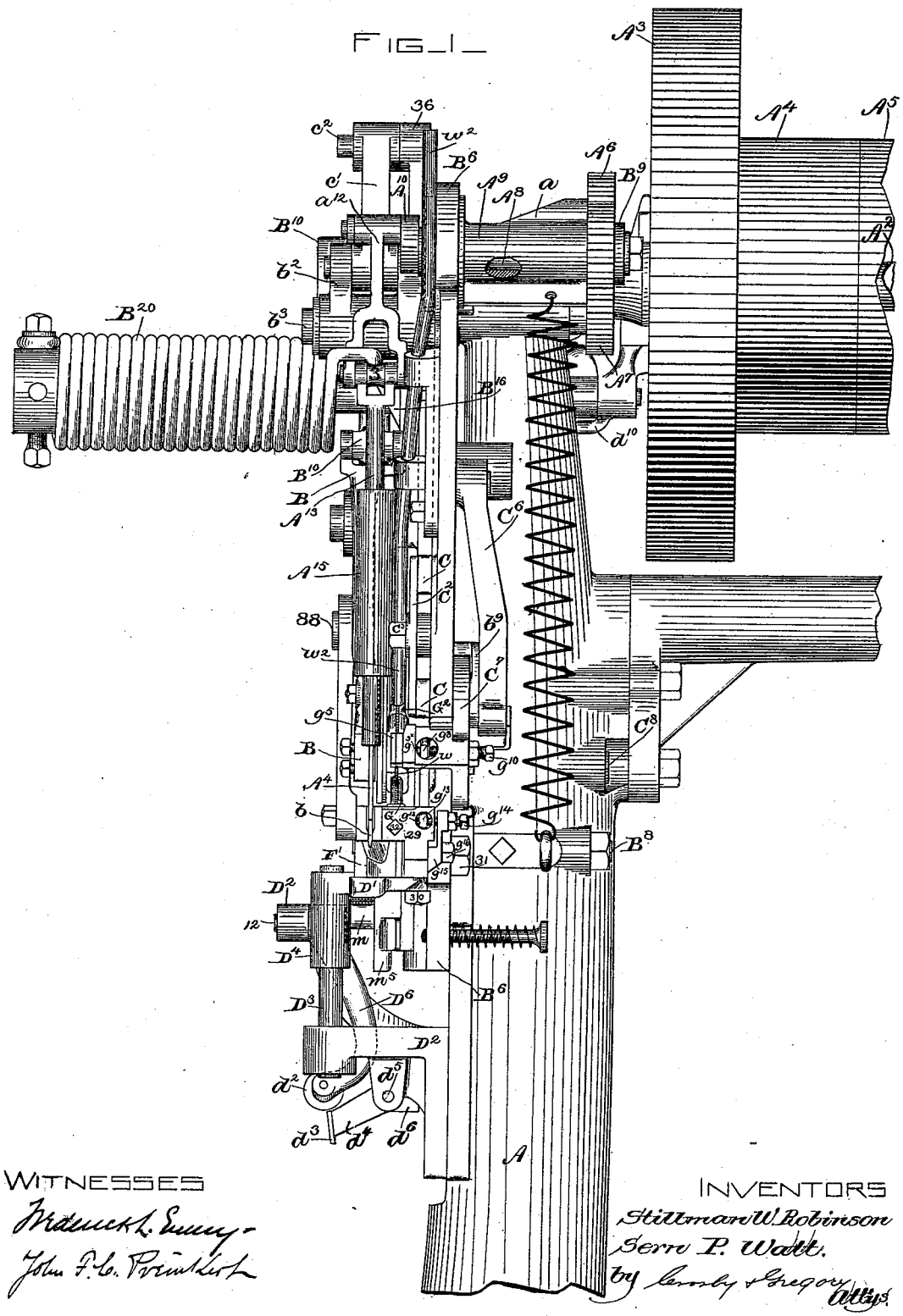

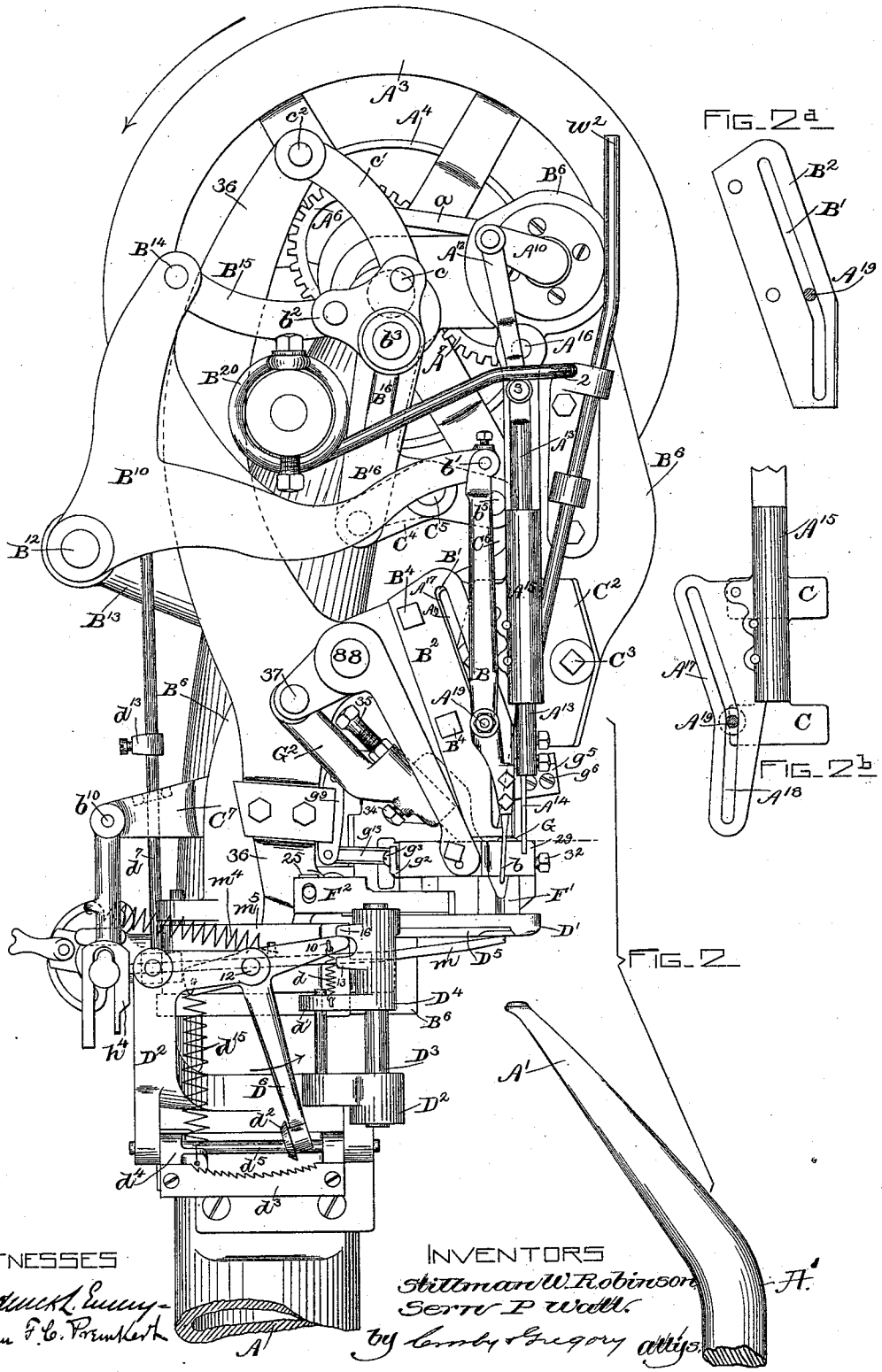

(No Model.) 6 Sheets—Sheet 3.

S. W. ROBINSON & S. P. WATT.
NAILING MACHINE.

No. 447,358. Patented Mar. 3, 1891.

WITNESSES

INVENTORS
Stillman W. Robinson,
Serno P. Watt,
by Crosby Gregory attys.

(No Model.) 6 Sheets—Sheet 4.
S. W. ROBINSON & S. P. WATT.
NAILING MACHINE.
No. 447,358. Patented Mar. 3, 1891.
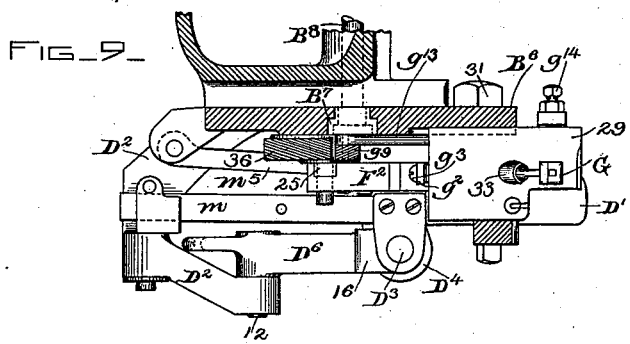
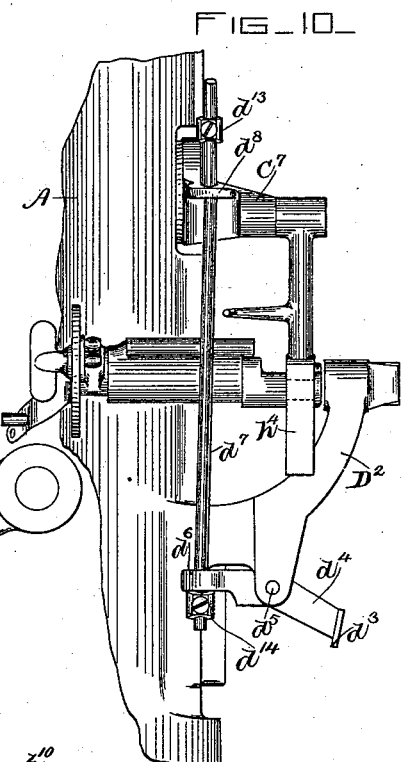
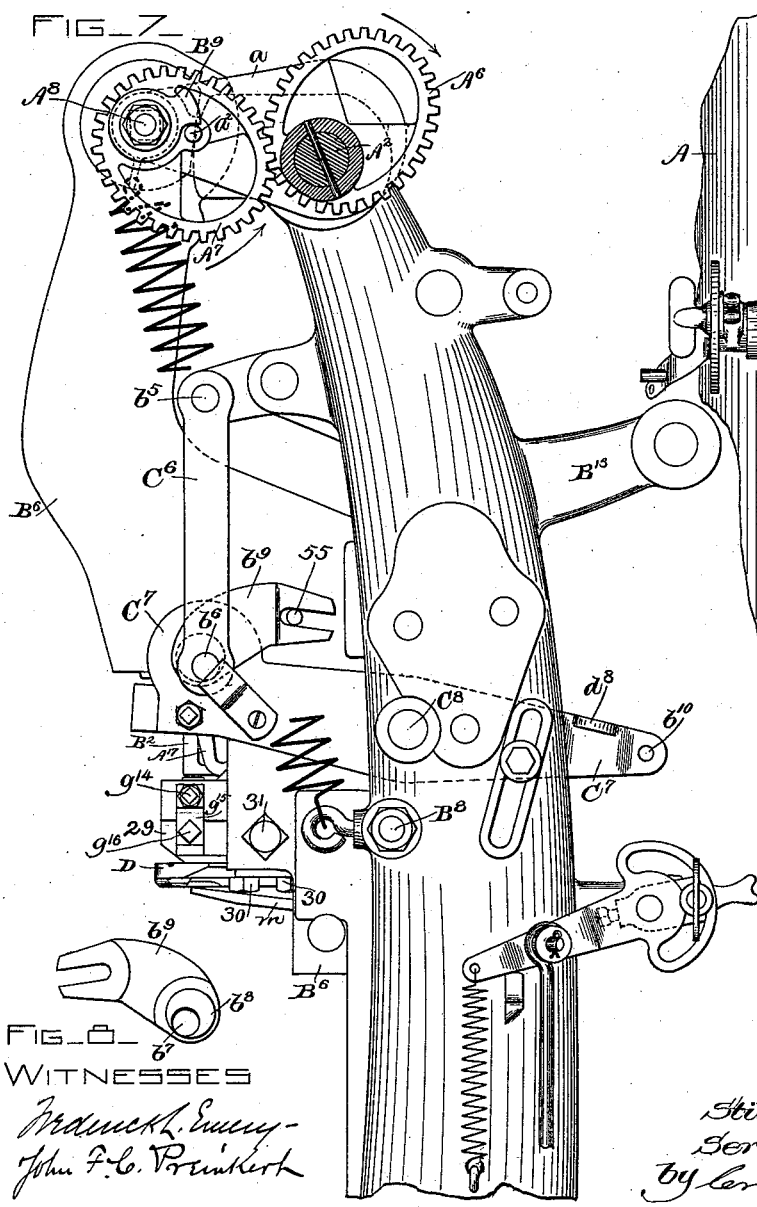
WITNESSES
INVENTORS

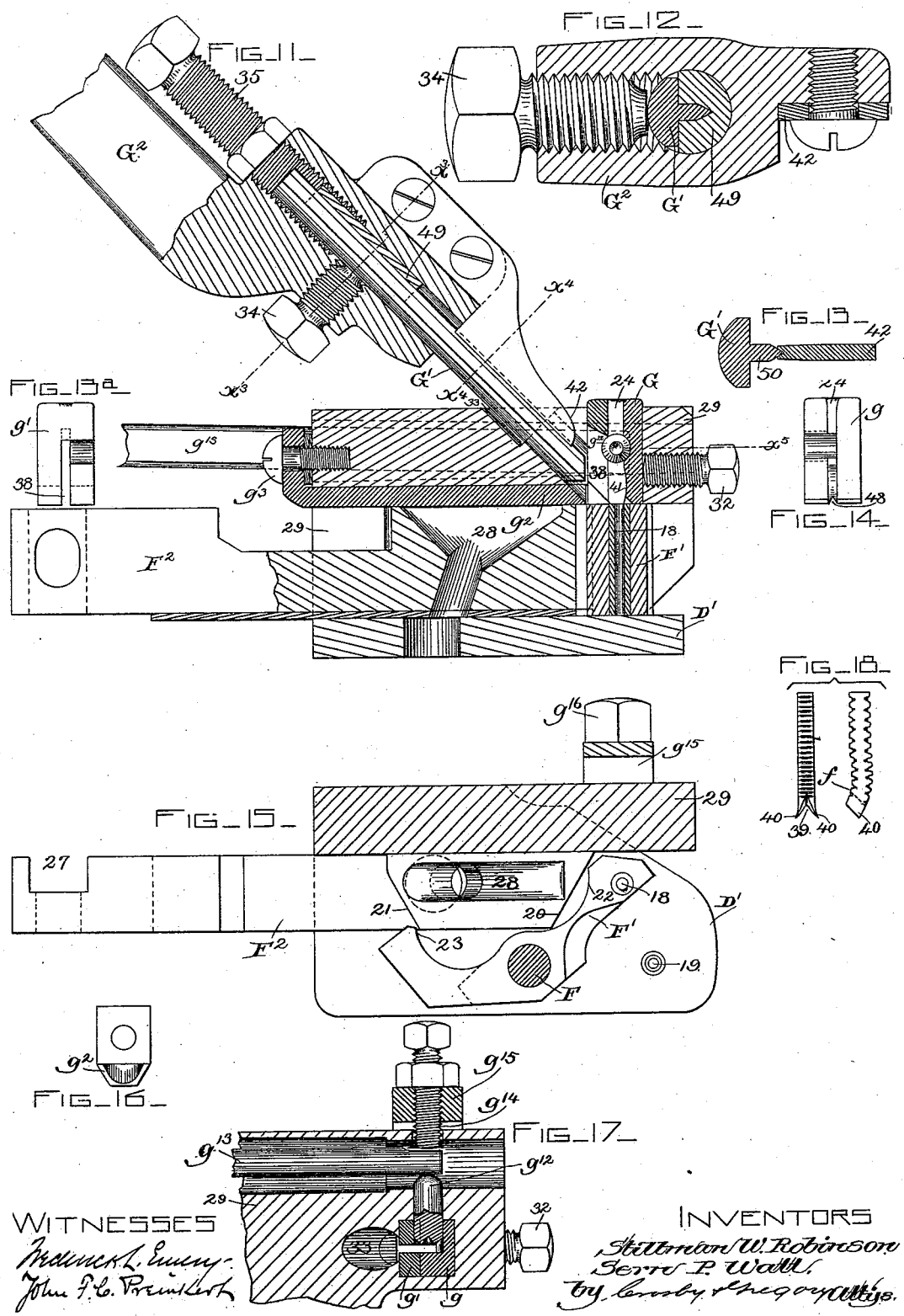

(No Model.) 6 Sheets—Sheet 6.

S. W. ROBINSON & S. P. WATT.
NAILING MACHINE.

No. 447,358. Patented Mar. 3, 1891.

Witnesses.
Geo. C. Hunting.
John F. C. Brinkerh.

Inventor
Stillman W. Robinson
Serre P. Watt.
By Crosby & Gregory Attys.

UNITED STATES PATENT OFFICE.

STILLMAN W. ROBINSON AND SERN P. WATT, OF COLUMBUS, OHIO, ASSIGNORS TO THE WIRE GRIP FASTENING COMPANY, OF CHICAGO, ILLINOIS.

NAILING-MACHINE.

SPECIFICATION forming part of Letters Patent No. 447,358, dated March 3, 1891.

Application filed June 9, 1890. Serial No. 354,706. (No model.)

*To all whom it may concern:*

Be it known that we, STILLMAN W. ROBINSON and SERN P. WATT, of Columbus, county of Franklin, State of Ohio, have invented an Improvement in Nailing-Machines, of which the following description, in connection with the accompanying drawings, is a specification, like letters and figures on the drawings representing like parts.

This invention has for its object the production of a novel machine for inserting metallic fastenings into leather-work.

In accordance with our invention, as herein contained, a wire, preferably somewhat flattened or smooth at its sides and corrugated at one or both edges, is engaged by a feeding device shown as adapted to clamp the wire and feed it into a cutting-box, where it is clamped and held while a cutter is moved forward to notch the leading end of the wire and form a suitable point for the nail next to be cut from the leading end of the wire, the said wire near its point end being preferably somewhat bent, so that the extremity of the point formed by an oblique cut may be placed in the line of the axis of the nail or fastening to prevent offshooting of the whole point of the nail and to insure proper clinching, as will be described. While the wire is held clamped in the cutting-box and the point is being formed, as described, the wire-feeding devices are moved backwardly along the wire, and the wire having been pointed the clamping device in the cutting-box is released and the wire-feeding device again engages the wire and passes the pointed end thereof a greater or less distance into a vertical passage in a nail-carrier, according to the length of nail desired or the thickness of the stock on the horn, the said nail-carrier being as thick vertically as the longest nail. The pointed end of the wire having been inserted into the nail-carrier, the latter is swung about a vertical axis, cutting off the wire between the lower end of the cutting-box and the said nail-carrier, the latter placing the nail or fastener carried by it in position over a hole and under a driver actuated in one direction, preferably, by a crank and pitman and in the other direction by a spring, the driver striking the nail and driving it into a hole previously made in the leather by an awl, the latter having descended and perforated the leather while the nail-carrier was in position under the cutting-box. To enable the nail-carrier to have as much time as possible for its movements during each rotation of the main shaft of the machine and the driver to be kept substantially at its upstroke as long as possible while the nail-carrier is being moved, we have provided the main shaft of the machine with a non-circular gear, which engages a non-circular gear on the shaft carrying the crank for lifting the driver-bar.

In nailing-machines using metallic-driven fastenings it is customary to provide for a certain length of clinch irrespective of the length of the fastening.

In our experiments we have found that the longer the nail the greater the amount of upset, so when feeding the wire for the longer fastenings to accord with any increase in the thickness of the leather if provision is not made for the upsetting the extent of the clinch will be correspondingly reduced. To provide for this we have devised means whereby the wire-feeding mechanism has an increased movement or feed as the nail increases in length to thus supply sufficient wire to counterbalance the increased loss of length due to upsetting. To do this we have provided an eccentric which is interposed between the lever carrying the wire-feeding devices and the link for actuating said devices, so that change of position of the said lever for feeding the wire for long nails causes the said eccentric by its change of position to give a slightly-greater movement to the lever for actuating the feeding device. The machine has a rising and falling head and a nose-plate to act against the leather on the usual horn, and we have combined with the said nose-plate and feed-bar a foot-lift to be described. We have combined with the foot-lift means for actuating it, so that the foot-lift is always lifted a definite distance above the material or stock on the horn, regardless of the thickness of the stock. We have also provided novel means whereby the awl and driver are made to descend in the same hole in the nose-plate. The nail-pointing mechanism is also of novel and peculiar construction, it, as shown, containing a pointed tool adapted to cut a V-shaped notch from one to the other side in the leading end of the wire, the direction of movement of the said pointing-tool being oblique to the axis of the wire, the pointing-tool leaving the end of the wire with a bifurcated or double-pronged point, the extremities of which lie substantially in line with one side of the wire; but to place the extremities of the prongs in the line of the axis of the wire a bender moving in unison with the pointing-tool acts upon the wire just after it is pointed to bend the wire slightly just above the said point. After this the wire is fed into a nail-carrier for a distance equal to the required nail length, which varies according to the thickness of the stock, and the nail-carrier is then moved aside to place the nail in driving position, and in so doing acts to sever the wire. While the lower grippers hold the wire the pointing is performed and the upper grippers are moved back over the wire for a distance, after which the grip is shifted from the lower to the upper grippers preparatory to feeding the wire forward for the next nail.

Figure 5:
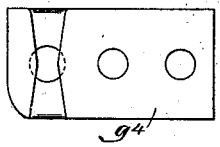
Figure 3:
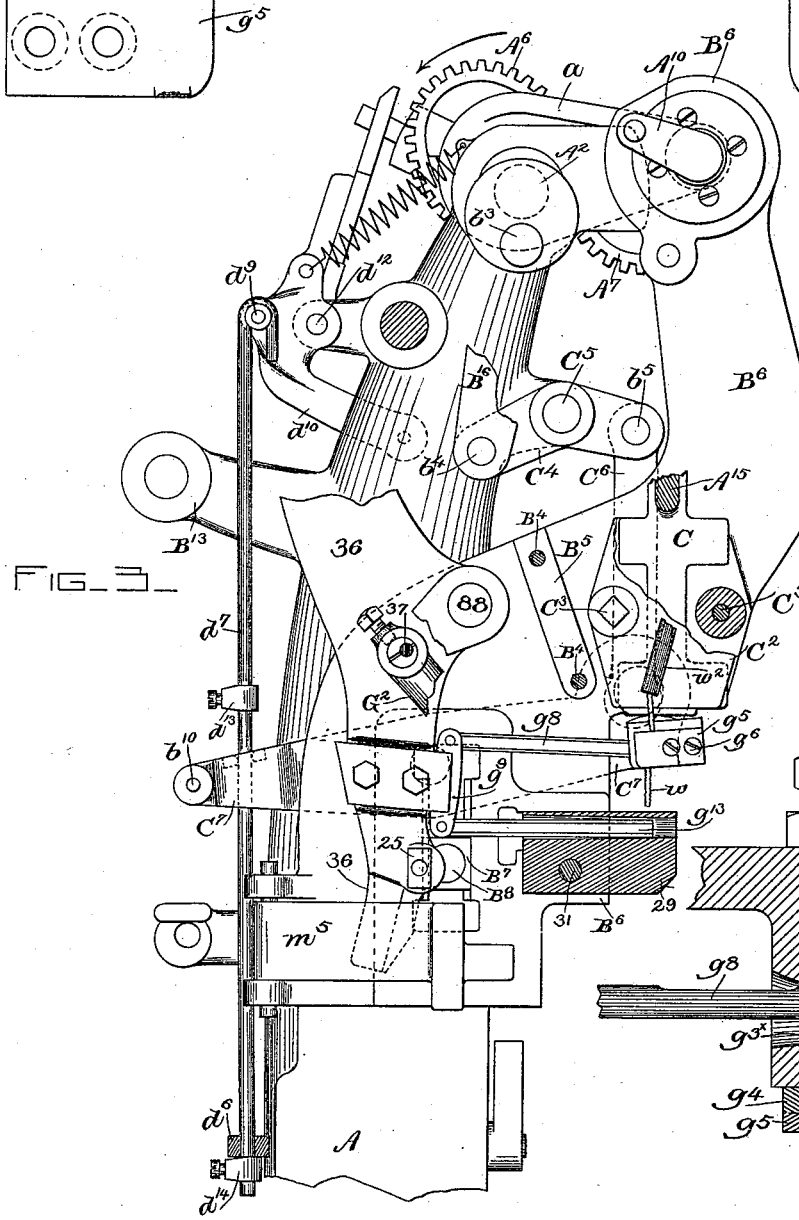
Figure 6:
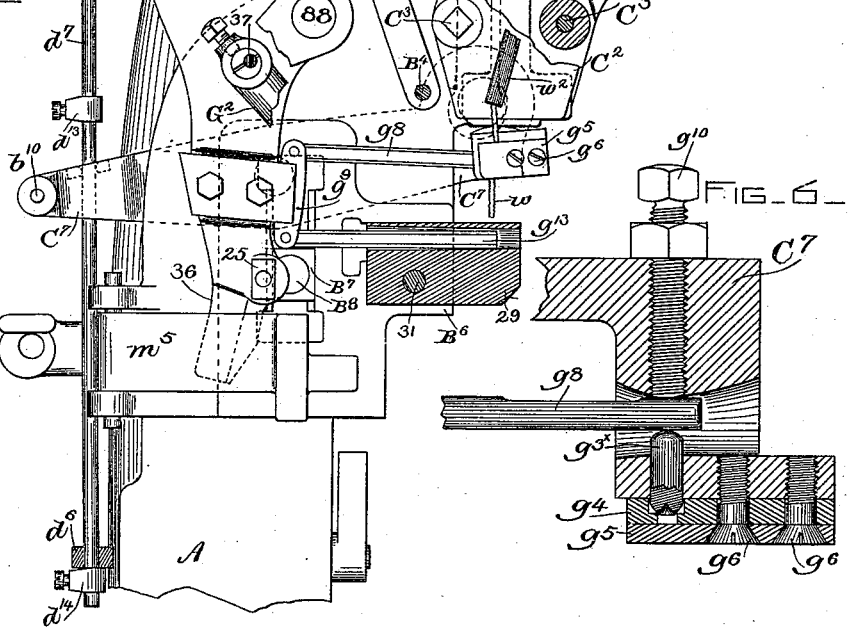
Figure 20:
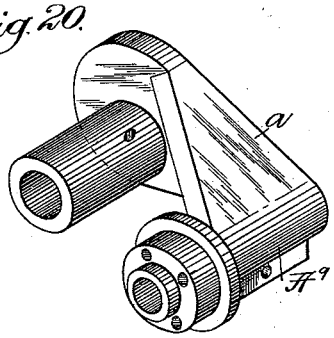
Figure 19:
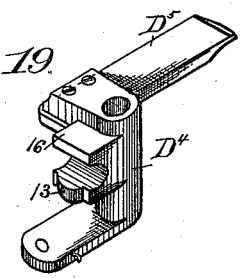
Figure 21:
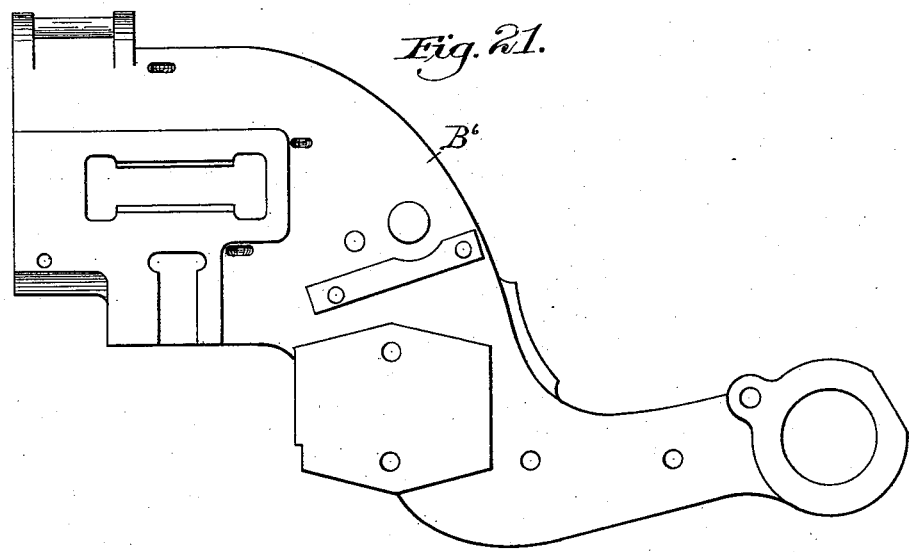

Figure 1 is a front elevation of part of a nailing-machine embodying our invention. Fig. 2, a view of the machine shown in Fig. 1, looking from the left. Figs. $2^a$ and $2^b$ show portions of the mechanism for placing the awl and driver-bar alternately in position; Fig. 3, a similar view to Fig. 2, parts at the front in said figure being removed to more clearly show parts behind them. Figs. 4, 5, and 6 are details referring to the upper gripper; Fig. 7, a partial elevation looking from the right in Fig. 1, the driving-pulley and parts supporting it being removed; Fig. 8, a detail of the eccentric co-operating with the feeding mechanism to provide extra length of nail for upsetting; Fig. 9, a detail to show the cutting-box, the nose-plate, part of the foot-lift, and shoe-feeding mechanism; Fig. 10, a detail taken from the rear of the machine to show parts of the foot-lift and shoe-feeding mechanism; Fig. 11, an enlarged detail of the pointing-tool, bender, the cutting-box, and the nail-carrier; Fig. 12, a section in the line $x^3$; Fig. 13, a section in the line $x^4$; Figs. $13^a$ and 14, details of the cutting-box; Fig. 15, a detail of the nail-carrier. Fig. 16 shows the bar $g^2$ detached; Fig. 17, a detail of the lower gripper mechanism. Fig. 18 shows the nail made in the machine to be described. Fig. 19 shows the foot-lift detached. Fig. 20 shows the frame $a$ detached and Fig. 21 shows the main slide detached.

Referring to the drawings, A represents a column forming part of the main standard or frame-work of the machine, it having suitable bearings to support the working parts.

We have considered it unnecessary to show the lower part of the standard and have represented the horn A′ only in Fig. 2, it being supposed that the said horn is substantially the same as in United States Patent No. 325,274, heretofore granted to one of us.

The main shaft $A^2$ of the machine has loose upon it a suitable fly-wheel $A^3$, to which is connected a belt-pulley $A^4$, and alongside of the latter is a loose pulley $A^5$. In practice the fly-wheel will have interposed between it and the main shaft a suitable clutch mechanism under the control of the operator, by which to stop and start the rotation of the main shaft from the continuously-rotating fly-wheel; but as the said clutch mechanism is not to be claimed herein the same is not shown and specifically described, for any usual and suitable clutch mechanism may be employed. The main shaft $A^2$ has suitably fixed to it a non-circular gear $A^6$, which engages a similarly-shaped non-circular gear $A^7$, mounted loosely on the crank-shaft $A^8$, which rotates in a bearing $A^9$ (see Fig. 20) of a yoke or frame $a$, mounted loosely upon and adapted to move for a slight distance about the main shaft as a center. The shaft $A^8$ has at its front end a crank $A^{10}$, (see Figs. 1, 2, and 3,) having a suitable pin, which receives upon it a link $A^{12}$, which is jointed to the upper end of the driver-bar $A^{13}$, the said driver-bar provided at its lower end with a driver $A^{14}$, being extended through a guide $A^{15}$, pivoted at $A^{16}$, and having attached to it at its rear side a cam-plate $A^{17}$, provided with a cam-slot $A^{18}$, which receives a pin $A^{19}$, projecting from the inner side of the awl-carrying bar B, the said pin being passed through a cam-slot B′ in a cam-plate $B^2$, fixed by suitable bolts $B^4$ to a projection $B^5$, (shown best in Fig. 3,) forming part of what we denominate as the "main slide" $B^6$, it being a casting of irregular shape, as best shown in Fig. 2, the upper end of the main slide being bored to receive through it part of the hub $A^9$, before described, through which is extended the shaft $A^8$. The main slide $B^6$ is slotted near its lower end for the reception of a block $B^7$, Fig. 3, mounted loosely upon a stud $B^8$, fastened in the standard by a suitable nut. (See Fig. 7.)

Referring again to the shaft $A^8$, it has fast upon it at its right-hand end a dog $B^9$, the shape of which is best shown in Fig. 7, which is acted upon by a pin $a^2$, connected to and traveling with the gear $A^7$. The said pin $a^2$, during the rotation of the gear $A^7$, by acting upon the dog, will rotate the shaft $A^8$ until the pin $a^3$ on the crank $A^{10}$ passes its upper dead-center, at which time or soon after which the end 2 of the driver-bar-actuating spring $B^{20}$ acts upon the roller or other stud 3, attached to the driver-bar, and quickly throws the said driver-bar down to drive the nail, the dog $B^9$ at such time traveling away from the pin $a^2$, because at such time the shaft $B^8$ derives its rotation from the said driver-bar, actuating spring rather than from the non-circular gear $A^7$. This loose connection of the non-circular gear with the driver-bar-lifting shaft, as described, enables the said shaft to be rotated at one speed to lift the bar and at another speed during the driving operation, which is an essential feature of my invention. By making these gears $A^6$ $A^7$ non-circular, as described, it is possible to pick up the driver promptly after the same has been thrown down by its spring, and it is also possible to keep the driver up for a considerable length of time during each rotation of the main shaft, in order that the nail-carrier as well as the awl may have sufficient time during each rotation of the main shaft to do their work without interference from the driver-bar. The driver-bar and its actuating means are substantially the same as in United States Patent No. 416,272.

The tongue C (see Fig. $2^b$) on the driver-bar guide works in a space between a cap-plate $C^2$ and the main slide $B^6$, the cap-plate being held in place by a suitable bolt $C^3$, and in this manner it is possible to swing the guide $A^{15}$ on or with relation to the said main slide, as is necessary in order to enable the driver to enter at the proper times the hole in the nail-carrier $F'$, Fig. 15, to drive out therefrom the nail into the stock, the said driver-bar at other times being swung aside to permit the awl $b$, attached to the awl-carrier B, to enter the nose-plate and make a hole for the next nail to be driven by the driver.

The pin $A^{19}$, referred to as connected to the inner side of the awl-carrying bar, extends first through the slot $B'$ in the plate $B^2$, (see Fig. $2^a$,) and then through the slot $A^{18}$ in the plate $A^{17}$, connected to the driver-bar guide, and this pin is the device which causes the awl-bar to be guided during its reciprocations, and at the same time the said pin, by acting in the slot $A^{18}$ of the cam-plate $A^{17}$, causes the driver-bar slide and driver to be swung in the proper direction about the pivot $A^{16}$ to insure the passage of first the awl and then the driver through one and the same hole in the nose-plate $D'$.

The awl-bar B is jointed at $b'$ to a lever $B^{10}$, pivoted at $B^{12}$ on a stand $B^{13}$, extended from the standard A, the upper end of the said lever having jointed to it at $B^{14}$ a link $B^{15}$, in turn jointed to an ear $b^2$ of a pitman $B^{16}$, having a hole to fit over a crank-pin $b^3$ on the main shaft $A^2$. The lower end of the pitman $B^{16}$ is jointed at $b^4$ to a rocking lever $C^4$, having its fulcrum on a stud $C^5$, held in a suitable ear of the main standard, the opposite end of the said rocking lever being jointed at $b^5$ to the upper end of a link $C^6$, having a pin $b^6$, (shown in Fig. 7,) which pin enters a hole $b^7$ in an eccentric $b^8$, (see Fig. 8,) an arm $b^9$ forming part of the mechanism for regulating the extra feed of the wire to provide for upsetting of the nail. The eccentric $b^8$ enters a hole in one end of a lever $C^7$, pivoted at $C^8$ upon the main standard, the opposite end of the said lever having a pin $b^{10}$, on which hangs the cam-bar $h^4$, which performs substantially the same purpose herein as in United States Patent No. 346,129, granted to me July 27, 1886, the said cam-bar, through mechanism substantially such as described in the said patent, giving the back and forth motions to the sole-feeding bar $m$, the other motions being given to the said bar from the said sole-feeding bar $m$ by the incline at the lower end of a lever 36, pivoted at 88, the said incline coming against a cam-block $m^5$. The lever 36 and cam-block $m^5$ are substantially the same in construction and operation as in the patent referred to, a spring $m^4$ moving the sole-feeding bar in opposition to the cam-block $m^5$. The upper end of the pitman $B^{16}$ is jointed at $c$ to a link $c'$, in turn jointed at $c^2$ to the upper end of the lever 36, before referred to. The nose-plate $D'$ is attached to the lower part of the main slide $B^6$.

The standard A has suitably secured to it a stand $D^2$, upon which is erected a vertical stud $D^3$, which receives over it the hub or sleeve $D^4$, carrying the foot-lift $D^5$, (shown separately in Fig. 19,) which extends under the nose-plate $D'$. The outer end of the sole-feeding bar is normally held up against the under side of the foot-lift by the spring $m^4$.

In the operation of the machine the foot-lift is raised from the stock for a defined distance, no matter what the thickness of the stock upon the horn $A'$, by a spring $d$, attached to an arm $d'$ of the sleeve $D^4$, and to a pin 10 at one end of a three-armed lever $D^6$, pivoted at 12 on the stand $D^2$, this rising of the foot-lift enabling the stock to be left free upon the horn to be engaged and fed by the shoe-feed $m$. The upward movement of the sleeve $D^4$, carrying the foot-lift, is arrested by the contact of a stop 13 on the said sleeve with one arm of the three-armed lever $D^6$, the said lever during the upward movement of the sleeve by the spring being locked by the engagement, as herein shown, of a wheel or disk $d^2$ with a locking-plate $d^3$, carried by a locking-lever $d^4$, pivoted at $d^5$ on an ear depending from the stand $D^2$, as shown best in Fig. 1, the said locking-lever having a rearwardly-extended arm $d^6$, (see Figs. 1, 3, and 10,) through which is extended the rod $d^7$, the said rod being also extended through an ear $d^8$ of the lever $C^7$ and being hooked at its upper end upon a stud $d^9$ of a lever $d^{10}$, pivoted at $d^{12}$ on a projection from the main standard, the said lever $d^{10}$ having a hole at its inner end which in practice receives a rod connected to the usual stopping and starting treadle, the upper end of the said lever $d^{10}$ having attached to it suitable devices to control the engagement and disengagement of the clutch mechanism for rotating the main shaft at the desired times. The locking-lever $d^4$ has connected to it near its front end a spring $d^{15}$, the upper end of the said spring being attached to one of the arms of the three-armed lever $D^6$, so that the rigid part $d^3$ of the locking-lever is normally drawn up by the spring in the direction to engage the disk $d^2$, the said spring also acting normally to swing the long arm of the lever $D^6$ in the direction of the arrow upon it in Fig. 2. The nose-plate at the lower end of the sliding frame B⁶ in its descent upon the stock on the horn to compress the same strikes the foot-lift and carries it down with it on the stock and puts the stock 16 in position to accord with that thickness of stock, and while the foot-lift is resting on the stock the lever D⁶ is unlocked and placed under the control of the spring $d^{15}$, which turns the said lever until one arm thereof meets the stop 16, and then the said lever D⁶ is again locked, and it remains locked while the nose-plate makes its next ascent and descent, and as the nose-plate rises it releases the foot-lift, and the latter rises under the action of spring $d$ until the stop 13 meets one arm of the lever D⁶.

In the drawings the nose-plate and foot-lift are shown as elevated, as they will be when the machine is stopped.

The stops 16 and 13 rise and fall with the foot-lift, and the stop 16, according to its position, will arrest the disk $d^2$ opposite one or another of the notches in the plate $d^3$, so that when the plate $d^3$ is thrown upwardly, as will be described, to engage the said disk it will lock the lever D⁶ in position. At this time the foot-lift is held down upon the stock by the nose-plate, and the stop 16 rests against one end of the lever D⁶; but as soon as the nose-plate is lifted the sleeve D⁴, with the foot-lift, rises under the action of the spring $d$ until the stop 13 strikes the said lever, which leaves the necessary space between the surface of the stock and the foot-lift, and thereafter the nose-plate finishes its upward movement, leaving the foot-lift at the predetermined height.

During the operation of the machine the lever C⁷ is turned a uniform distance, and the ear $d^8$, as the rear end of the lever rises, strikes the collar $d^{13}$ and causes the collar $d^{14}$ at the lower end of the rod $d^7$ to strike the arm $d^6$ of the locking-lever $d^4$ and unlock the lever D⁶ to permit the same to be moved by the spring $d^{15}$ until arrested by the stop 16, and immediately thereafter the lever C⁷ retires from contact with the collar $d^{13}$ and permits the spring $d^{15}$ to act again and cause the locking-lever to engage the lever D⁶.

It is necessary to unlock the lever D⁶ to permit the foot-lift to rise into the position shown in Fig. 2 to enable the shoe to be taken off the horn, and to provide for this the rod $d^7$ is hooked upon the stud $d^9$, so that as the lever $d^{10}$ is turned by the operator to stop the machine it may act to lift the rod $d^7$ to turn the locking-lever $d^4$ and unlock the lever D⁶.

The nose-plate D' has pivoted upon it at F the nail-carrier F', it having a nail-hole at 18, the nose-plate having a hole at 19. The nail-carrier is vibrated at times about its pivot F by means of a cam-slide F², having two cam-surfaces 20 21, the cam-surface 20 acting against the cam-surface 22 of the nail-carrier, while the cam-surface 21 acts against the surface 23 of the nail-carrier, the object being to swing the said nail-carrier from a position with its hole 18 in line with the passage 24 of the cutting-box G into position over the hole 19 in the nose-plate.

The slide-bar F² receives its reciprocating movement from a block 25 (see Fig. 2) on a pin extended from the lever 36, the said block entering a notch 27 (see Fig. 15) in the outer end of the cam-slide F², the parallel or straight side of the cam-slide next to the nail-carrier acting upon the latter to lock the same in its two extreme positions at the proper time. The cam-slide has an opening 28 cut down through it to lead away the small pieces or chips cut out while pointing the wire, as will be described.

The nose-plate D' is suitably bolted by bolts 30 to the lower edge of an angle-shaped head-block 29, attached to the main slide B⁶ by a bolt 31. This angle-plate has secured in it by a screw 32 the cutting-box G, it having a vertical wire-passage for the wire nail, the said angle-plate having an inclined or oblique throat 33 for the reception of the pointing-tool G', herein shown as adjustably secured by bolts 34 and 35 in a pointing-tool carrier G², pivoted at 37 to the lever 36.

The side of the cutting-box G next the pointing-tool is slotted, as at 38, for the passage into the cutting-box and across the groove 24 of the end of the cutting-tool as it descends to cut a V-shaped notch 39 (see Fig. 18) from one to the other side of the leading end of the wire in a slanting direction to leave two clinching-prongs 40. One side of the wire-passage in the cutting-block G is concaved, as at 41, to receive against it one side of the wire just above the end to be pointed, the nail being bent into the said concavity by means of a suitable bender 42, moved in unison with the point-cutter, the bender putting into the body of the nail a bend, as at $f$, (see Fig. 18,) to place the extremity of the point 40 of the nail in the axial line of the wire or of the nail-body.

The cutting-box G is made in two parts $g\,g'$, the part $g$, having the wire-passage 24, being provided at its lower end with a slanting notch 48, (see Figs. 11 and 14,) into which the end of the point-cutter G' enters, the part $g$ about the notch 48 serving to support the wire near its end and also serving as the second member of a cutter.

The pointing-tool in cutting the slanting notch 39 in the end and from one to the other side of the wire would leave the extremities of the two prongs 40 in the line of one side of the wire, which would be objectionable in clinching, so to obviate this and bring the extremities of the prongs in the line of the axis of the wire and nail I have provided this part of the cutting-box with a concavity 41 just above the notch 48, into which the body of the nail just above the point is pushed by a suitable bender, as 42, attached to or moving in unison with the pointing-tool, the bender making the bend $f$ in the nail. The cutting-box is held in place by a set-screw 32. The point-cutter is shaped as represented in cross-section, Figs. 12 and 13, it having a fin 50, provided with a V-shaped edge to enter the notch 48, and to aid in holding the tool I have added a saddle 49, which (see Fig. 11) is held in place on the arm $G^2$. The lower end of the point-cutter while acting on the wire rests against an adjusting-plate $g^2$, fitted into (see Fig. 11) the flanged plate 29, and made adjustable by an adjusting-screw $g^3$, the end of the plate $g^2$ acting to keep the point-cutter up to its work and compensate for wear.

The wire $w$ used may be of any known construction or form in cross-section, and it may be taken from any usual reel and led through a wire-guiding tube $w^2$.

The wire-feeding device consists, chiefly, of an upper gripper member $g^{3\times}$, (see Fig. 6,) placed in a hole in the lever $C^7$ and extended into the wire-passage in or between the gripper-plates $g^4$ $g^5$, constituting a gripper-box and secured to the lever $C^7$ by the screws $g^6$. The gripper member $g^{3\times}$ is moved by a cam-rod $g^8$, which in its movement bears against an adjusting-screw $g^{10}$, screwed into the lever $C^7$ and checked by a check-nut. While the feeding-gripper $g^{3\times}$ is in grip the lever $C^7$ makes its descent, taking the wire with it, the holding-gripper $g^{12}$ at this time being released to permit the wire to descend into the nail-carrier for a distance sufficient for the next nail. When the wire has been fed, the grip is shifted to the holding-gripper $g^{12}$. This gripper $g^{12}$ enters a hole in the angle-plate 29, is extended into the wire-passage 24 of the cutting-box G, and is acted upon at its outer end by a cam-rod $g^{13}$, jointed to the lower end of the said plate $g^9$, it being suitably bolted or attached to the lever 36, the said rod $g^{13}$ acting at its rear side against an adjusting-screw $g^{14}$, held in a bracket $g^{15}$, attached by a set-screw $g^{16}$ to the angle-plate 29. These two cam-rods $g^8$ and $g^{13}$ are moved backward and forward in unison with the lever 36; but it will be noticed that while the cam-rod $g^8$ has its cam-recess back from its end the cam-rod $g^{13}$ has its cam-recess at its end, and so that they act alternately on the grippers to force one against the wire and release the other alternately. The feeding-gripper rises and falls with the lever $C^7$.

The arm $b^9$, having the eccentric $b^8$, has a slot in which enters a stud 55, attached to the slide-frame $B^6$, and it will be seen that the said arm will be turned more or less about the pin $b^6$ at the lower end of the link $C^6$, according to the distance that the nose-plate has to descend to meet the stock, the eccentric $b^8$ being turned after the said nose-plate meets the stock, and the extent to which it is turned depends upon the thickness of the same, and as the eccentric is turned it turns, and therefore changes the relative positions of the lever $C^7$ and link $C^6$, so that the feeding-gripper has given to it a greater throw for the longer nails to compensate for the greater upset.

We do not limit our invention to the precise construction of the pointing-tool and bender so long as they operate to notch and bend the wire as stated, nor to the exact construction of the pointing-tool holder.

Another application, Serial No. 354,944, filed shows the driver-bar actuated positively instead of by a spring in one direction, so herein we claim the non-circular gears only when one of them is mounted loosely on its shaft and has a co-operating dog.

We claim—

1. In a nailing-machine, a cutting-box having a notch where the end of the wire rests, combined with an inclined pointing-tool to enter said notch, and a carrier to actuate said tool, whereby the inclined tool cuts into one end of the wire a notch which is slanted with relation to the axis of the wire, leaving a two-pronged point, substantially as described.

2. The lever $C^7$, the feeding-gripper $g^{3\times}$, the cutting-box, and means to support it, combined with the pivoted carrier $G^2$, the pointing-tool attached thereto, and means to reciprocate the said carrier diagonally with relation to the axis of the wire, substantially as described.

3. The cutting-box notched at 48 and having a concavity at one side of the wire-passage, combined with the carrier $G^2$, the pointing-tool therein, shaped substantially as shown to co-operate with the notch 48 and cut a slanting notch in the end of the wire, and a bender moving with the said pointing-tool to bend the wire, substantially as described.

4. The cutting-box having the pointing-notch 48, the inclined pointing-tool, its diagonally-movable carrier, the main slide $B^6$, and the nose-plate $D'$, supported thereby and having a nail-passage 19, combined with a pivoted nail-carrier interposed between the said cutting-box and nose-plate, substantially as described.

5. The nose-plate having a nail-passage 19, and a nail-carrier pivoted thereon, having at its inner side and at the opposite sides of its center concaved cam-surfaces 22 and 23, combined with the cam-slide $F^2$, to vibrate and lock the said nail-carrier accurately in its two extreme positions at the proper time, substantially as described.

6. The cutting-block having the point-forming notch 48 and the wire-passage, an inclined pointing-tool and its reciprocating carrier, and the nose-plate having a nail-passage, combined with the nail-carrier having concaved cam-surfaces 22 and 23, and the cam-slide to vibrate the same to cut off the wire between it and the cutting-box and to lock the said nail-carrier in its extreme positions, substantially as described.

7. The cutting-box having the point-forming notch 48 and wire-passage, the carrier and its connected inclined pointing-tool, to form a point for the end of the wire, the nail-carrier, the nose-plate $D'$, having a nail-passage, a wire-feeding device, substantially as described, to feed the pointed end of the wire into the nail-carrier for a greater or less length, according to the thickness of the stock on the horn, and a cam-slide to vibrate the nail-carrier to cut off the pointed end of the wire and form a nail of the desired length and place the said nail over the nail-passage in the nose-plate, substantially as described.

8. The lever 36, its attached plate $g^9$, and the gripper-actuating cam-rods $g^8$ and $g^{13}$ jointed thereto, combined with the two grippers, the gripping-plates, the lever $C^7$ to actuate them, and the cutting-box, to operate substantially as described.

9. In a nailing-machine, a wire-feeding device consisting, essentially, of a sliding pin, as $g^3$, a cam-rod to actuate it, a block having a wire-passage entered by the said pin, and an adjusting screw to adjust the said cam-rod, substantially as described.

10. The main shaft, the frame $a$, pivoted thereon and having the bearing $A^9$, the main slide $B^6$, entered by the said bearing, the driver-bar guide pivoted on the said main slide, the driver-bar, its attached driver and link, combined with the shaft $A^8$, having a crank, and means to actuate the said shaft, substantially as described.

11. The main shaft, the frame $a$, pivoted thereon and having a bearing $A^9$, the crank-shaft $A^8$ in said bearing, the connected driver-bar, the driver, a dog attached to the said shaft $A^8$, a non-circular gear loose on the said shaft, a pin or projection between the said dog and gear, a non-circular gear fast to the main shaft, and a spring to actuate the driver and through it rotate the shaft $A^8$ during a part of each rotation, for the purpose set forth.

12. The awl-bar B, the lever to move it, the slotted cam-plate $B^2$, and the pivoted driver-bar guide having a slotted cam $A^{17}$ and the driver-bar, combined with the pin $A^{19}$ to enter the cam-slots of both the said bars to move the awl-bar and driver-bar laterally, as desired, to enable them to move alternately in the same path, substantially as described.

13. In a nailing-machine, the following instrumentalities, viz: a nose-plate to bear on the stock, the movable slide $B^6$, with which the nose is connected, a wire-holding gripper carried by and adapted to rise and fall with the said slide and nose-plate, a wire-feeding gripper, a carrier for the said feeding-gripper, means to raise and lower the said carrier with relation to the nose-plate, and means to automatically vary the nail length to compensate for upset, substantially as described.

14. The wire-feeding gripper, a carrier for the said gripper, and the pin $b^6$ and means to move it, combined with an eccentric $b^8$ interposed between the said carrier and the said pin, and means to operate the said eccentric, substantially as and for the purpose described.

15. The vertically-movable foot-lift, the lever $D^6$, the stops 13 and 16, rising and falling with the said foot-lift, a spring to raise the foot-lift, and a locking device for the said lever, substantially as described.

16. The vertically-movable foot-lift, the lever $D^6$, the stops 13 and 16, rising and falling with the said foot-lift, a spring to raise the foot-lift, and a locking device for the said lever, and means to actuate the said locking device, substantially as described, to lock and release the said lever $D^6$ at the proper times, as and for the purposes set forth.

In testimony whereof we have signed our names to this specification in the presence of two subscribing witnesses.

STILLMAN W. ROBINSON.
  SERN P. WATT.

Witnesses:
 C. C. SHEPHERD,
 BARTON GRIFFITH.